United States Patent [19]

Persson et al.

[11] 4,385,548
[45] May 31, 1983

[54] BRAKE UNIT HAVING A SLACK ADJUSTER

[75] Inventors: Erling Persson, Staffanstorp; Lars B. Axelsson, Malmö, both of Sweden

[73] Assignee: Knorr-Bremse GmbH, Munich, Fed. Rep. of Germany

[21] Appl. No.: 247,620

[22] Filed: Mar. 25, 1981

[30] Foreign Application Priority Data

Mar. 26, 1980 [DE] Fed. Rep. of Germany ....... 3011713

[51] Int. Cl.³ .............................. F16J 1/10; F01B 3/00
[52] U.S. Cl. ........................................ 92/33; 92/129; 92/130 D; 188/196 D
[58] Field of Search ............ 92/130 D, 130 R, 130 C, 92/129, 31, 33; 188/196 D

[56] References Cited

U.S. PATENT DOCUMENTS 3,100,032  8/1963  Larsson ........................ 188/196 D
3,589,477  6/1971  Sander ......................... 188/196 D
4,005,767  2/1977  Farello ......................... 188/196 D Primary Examiner—Paul E. Maslousky
Attorney, Agent, or Firm—Edmund M. Jaskiewicz

[57] ABSTRACT

A brake unit for automatically adjusting slack between the brake surfaces of a railway brake has a pre-stressed spring which is released during the initial stroke of the brake piston in a braking application so as to expedite contact of the brake surfaces. After slack has been overcome, further movement of the piston in the braking direction will cause the force-transmitting components to be coupled together so that braking force is transmitted directly to the brake surfaces by subsequent movement of the piston in the braking direction. The release of the pre-stressed spring during the overcoming of slack in the brake rigging will increase the speed of the brake application with respect to the speed of the braking piston.

7 Claims, 4 Drawing Figures

BRAKE UNIT HAVING A SLACK ADJUSTER

The present invention relates to a brake unit of the type employed with brake rigging on railway vehicles, more particularly, to such a brake unit which automatically adjusts slack between the brake surfaces of the brake.

Various forms of brake units incorporating automatically operating devices for adjusting slack between the brake surfaces of a brake have been proposed. Such brake units generally transmit the brake force by means of a spindle having non-self-locking threads and a nut which is threaded on the spindle and rigidly connected to a sleeve receiving the spindle. A spring is mounted so as to exert a force on the spindle and sleeve in the direction to increase their total length. The elements transmitting the force of the spring during the initial movement of the brake rigging to overcome any slack or play in the rigging may comprise a flange having a first coupling surface capable of transmitting torque and an axial force and connected to the piston of the piston-cylinder unit incorporated in the brake unit.

A brake unit of the above-described construction has been disclosed in U.S. Pat. No. 3,430,739 wherein there is described a device capable of adjusting the slack between the brake surfaces of the brake during the initial stages of a brake application movement of the brake rigging in which the amount of existing slack is undesirable. However, brake units of this general type must employ rather strong springs for accumulating the energy which is necessary to be released during the initial movement taking up of the slack. In addition, such brake units must also have rather strong return springs in order to provide sufficient force for reloading the strong energy accumulating springs.

It is therefore the principal object of the present invention to provide a novel and improved brake unit for automatically adjusting slack between the brake surfaces of a brake.

It is a further object of the present invention to provide such a brake unit in which the motion of the piston during the time which the brake surfaces have not yet contacted with each other in the initial stage of a brake application can be utilized.

It is an additional object of the present invention to provide such a brake unit having different internal gear or force transmission ratios during the initial portion of the brake application stroke before the brake surfaces have come into contact and after the brake surfaces have come into contact.

It is another object of the present invention to provide such a brake unit having a return spring of comparatively low force but of a force which is still sufficient to accomplish the necessary energy transmitting function.

According to one aspect of the present invention which achieves the above-stated objects, there may be provided a brake unit having a sleeve axially displaceable within a tubular extension of the brake cylinder. The sleeve is adapted to be connected to the brake rigging of the brake. A threaded spindle shaft engages a threaded adjusting nut which is rigidly mounted on the sleeve and the spindle shaft is axially displacable with respect to the sleeve. A first spring acts against the sleeve in a direction to increase the total length of the sleeve and spindle shaft. There is a piston slidable within the cylinder and the piston has opposed first and second coupling surfaces for transmitting torque and axial forces. The first and second coupling surfaces transmit axial forces in opposite directions. A second spring urges the spindle shaft in the brake release direction against a first shoulder on the cylinder so as to limit axial movement of the spindle shaft in the brake release direction. A control shaft is threadedly engaged within a second set of non-self-locking threads on the spindle shaft and is axially and rotatably moveable with respect to the spindle shaft. A third spring is carried by the piston and acts upon the control shaft in the same direction as the first spring so as to urge a third coupling surface on the control shaft into engagement with the second coupling surface on the piston. The spindle shaft and the control shaft have axially spaced opposing surfaces and the axial distance between these opposing surfaces is less than the axial distance between the first coupling surface and a fourth coupling surface on the spindle shaft when the brake unit is in its brake release position. The first coupling surface engages the fourth coupling surface when the opposing surfaces contact each other and the second and third coupling surfaces are disengaged.

A uni-directional clutch may be interposed between the control shaft and the piston so as to permit the control shaft to rotate in only one direction with respect to the piston.

In a further modification the first spring may be disposed between a second shoulder on the sleeve and a third shoulder on the piston. In still another modification the first spring may comprise a torsion spring which is connected between the sleeve and the spindle shaft.

Other objects and advantages of the present invention will be apparent upon reference to the accompanying description when taken in conjunction with the following drawings, which are exemplary, wherein.

Proceeding next to the drawings wherein like reference symbols and indicate the same parts throughout the various views a specific embodiment and modifications of the present invention will be described in detail.

Figure 1:
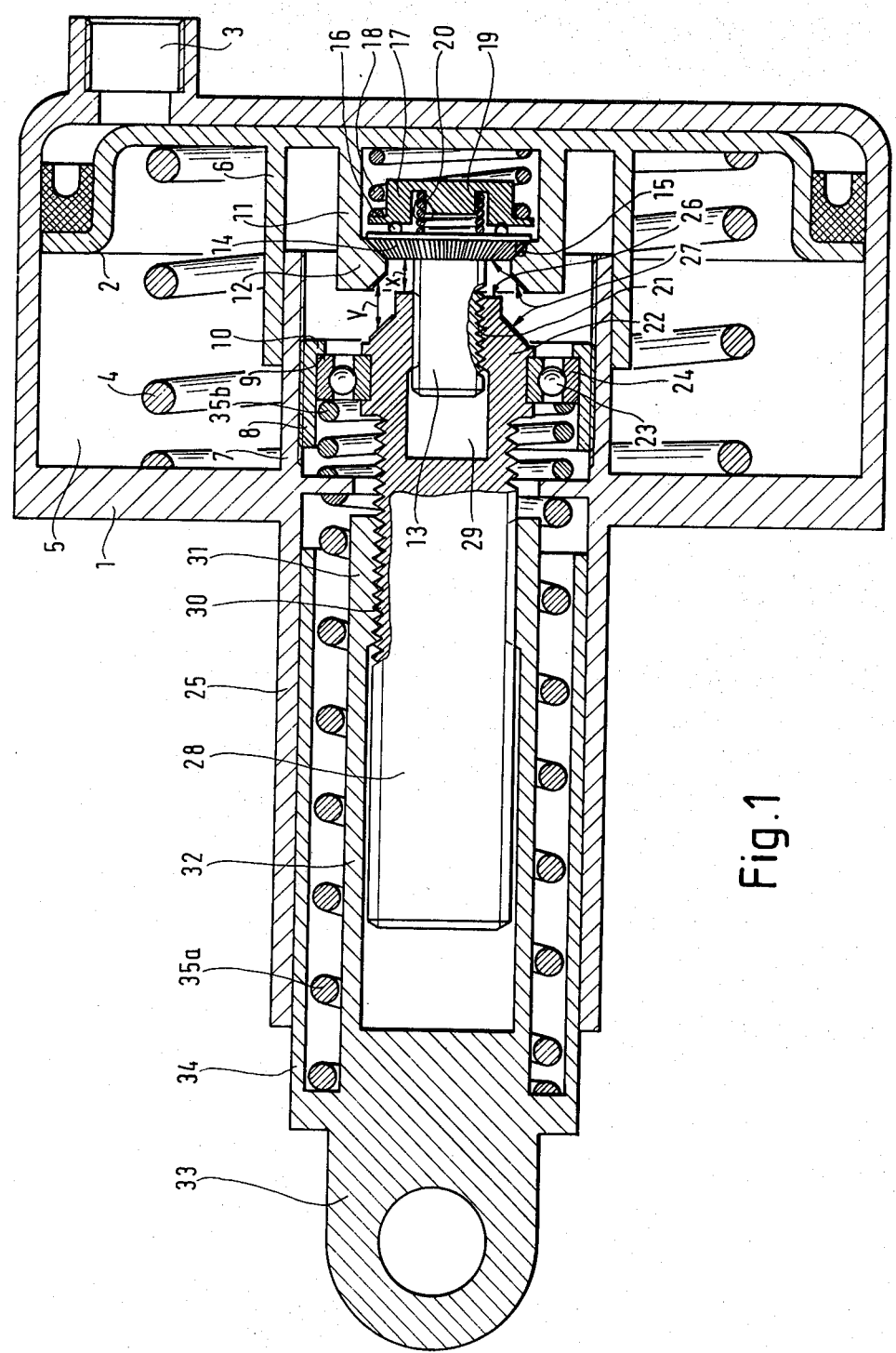
FIG. 1 is a longitudinal sectional view through a brake unit incorporating an automatic slack adjuster according to the present invention.

As may be seen in FIG. 1. the brake unit of the present invention comprises a cylinder housing 1 in which there is a slidably displaceable piston 2. A pressurized fluid which is generally air under pressure may be supplied through an inlet 3 in the cylinder housing to act upon one side of the piston 2. A piston return spring 4 acts against the opposite side of the piston. The return spring 4 is within a variable volume chamber 5 in the cylinder housing and this chamber 5 is vented to the atmosphere through a sleeve 6 which is rigidly connected to the piston 2 and is telescopingly displaceable with respect to another sleeve 7 which is rigidly connected to the inner surface of the cylinder housing 1. The inner surface of the sleeve 7 is threaded and threaded upon this surface is a sleeve 8 having an internal flange 10 at one end thereof in the direction toward the piston 2 and defining a shoulder 9. The shoulder 9 is facing in the axial direction which may be more accurately described as the brake applying direction. The threaded mounting of the sleeve 8 within the sleeve 7 permits the axial position of the sleeve 8 to be adjusted with respect to the cylinder housing 1.

The piston 2 further has an axially extending sleeve 11 on the outer end of which is an internal flange 12 on the opposite sides of which are provided conically shaped coupling surfaces A and B. The coupling surfaces A and B are serrated or provided with teeth so as to be capable of transmitting substantial torque forces. At the same time, the coupling surfaces A and B are capable of transmitting axial forces in opposite directions.

A control shaft 13 extends into the sleeve 11 and is provided with a flange 14 the peripheral surface of which is provided with a conical coupling surface C which is active in the brake applying direction and together with the opposing clutch surface B form a first coupling 15. An axial force is exerted against the flange 14 by means of a thrust ball bearing 16, a spring support 17 and a compression spring 18 which has one end bearing against a wall of the piston 2 and its other end exerting a force against spring support 17. The control shaft 13 and the spring support 17 are provided with coaxially disposed cylindrical surfaces of equal diameter surrounded by a tightly wound spring 19 which acts as a one-way clutch connection 20 between the control shaft 13 and the spring support 17. The spring support 17 is prevented from rotation with respect to the piston 2 by its connection with the spring 18.

The control shaft 13 is provided with non-self-locking threads 21 and is threaded into a control nut 22 on the outer surface of which is a ball-bearing 23 which is active in both the radial and axial directions. The ball-bearing 23 is axially displaceable with respect to the sleeve 8 but its axial movement in the brake release direction, or in the direction to the right as viewed in the drawing, is limited by the shoulder 9.

When the brake unit is in the fully released brake position as shown in FIG. 1, an end surface of the control nut 22 facing toward the piston 2 is located at a distance X from an opposed radial surface on the flange 14. This distance X corresponds to the desired slack or play in the brake rigging. These two opposed radial surfaces define a stop or abutment designated as 26. The control nut 22 is also provided with a conical coupling surface D which is adapted to engage with the adjacent conical coupling surface A on the flange 12 and thus form a second coupling designated as 27. The coupling surfaces A and D which form the second coupling 27 are similarly serrated or toothed so as to be capable of transmitting a substantial torque. In the position of the brake unit as shown, the axial distance between the coupling surfaces A and D of the coupling 27 is of the magnitude Y which is substantially equal to the distance X plus the necessary axial distance necessary for disengaging coupling 15 and engaging coupling 27.

The control nut 22 is rigidly connected or may be constructed integrally with a spindle shaft 28 which has an axial bore 29 at one end thereof into which the control shaft 13 may extend. The spindle shaft 28 has a diameter greater than the diameter of the control shaft 13 and is provided with external threads 30 having a non-self-locking pitch and threaded into an adjuster nut 31. The pitch of the threads 30 of the spindle shaft 28 is preferably greater than the pitch of the threads 21 on the control shaft 13.

The adjuster nut 31 is rigidly connected to a push sleeve 32 at the end of which remote from the piston 2 there is provided a connection eye 33 for direct or indirect connection to brake rigging elements of a friction brake which is not shown but is known in the art. The sleeve 32 is provided with an outer guide tube 34 which is axially slidable in an axial tubular extension 25 extending from the cylinder housing 1 and constructed as an extension of the inner sleeve 7. The sub-assembly consisting of the connecting eye 33, the push sleeve 32 and the guide tube 34 is prevented from rotation either by its connection to the brake rigging or by suitable guiding means not shown but known in the art and arranged between the outer guide tube 34 and tubular extension 25. The assembly 32, 33, 34 may be manually rotated after the eye 33 is disconnected from the brake rigging or after release of a locking device constructed similarly to the corresponding device shown in DE-PS 1 153 41.

A pre-stressed spring 35a is positioned between a radial shoulder interconnecting the outer guide tube 34 and sleeve 32 and a radial flange on the cylindrical housing 1. A further pre-stressed spring 35b is positioned between the other side of that flange on the cylinder housing 1 and outer ring 24 of the ball bearing 23.

The force exerted by the spring 35a is transmitted to the assembly 32, 33, 34 and through the threads 30 to the spindle shaft 28. This force being transmitted through the threads 30 will cause a torque to be exerted on the spindle shaft 28 and this torque is transformed through the threads 21 into an axial force which in turn is transmitted to the control shaft 13, the flange 14, the coupling 15, the flange 12, the sleeve 11, the piston 2 and the return spring 4 to the cylindrical housing 1.

The above described brake unit of FIG. 1 will operate as follows:

In order to actuate the brake unit, the cylinder 1 is pressurized by introducing air under pressure through inlet 3 and this pressurized air will move the piston 2 toward the left as viewed in FIG. 1 in the brake applying direction and against the force exerted by the return spring 4. This movement of the piston 2 will also cause movement of the spring 18, the spring support 17, the bearing 16 and the flange 14 of the control shaft 13 in the same direction as long as slack exists in the brake rigging. The coupling 15 between the flange 14 and the flange 12 will remain engaged so that the control shaft 13 is locked against rotation by the piston 2 which in turn is prevented from rotation with respect to the cylindrical housing 1 by suitable means not shown but known in the art. The spring 35b maintains the ball bearing ring 24 in contact with the shoulder 9 on the flange 10. As a result, the axial movement of the control shaft 13 in the brake applying direction will cause the spindle shaft 28 and the control nut 22 to rotate because of the force exerted by the spring 35a and the non-self-locking threads 21 and 30. This rotation of the shaft 28 will cause the adjuster nut 31 and accordingly the sleeve 32 to be axially displaced in the brake applying direction. At the same time, the distance X between the opposing radial surfaces on the control nut 22 and flange 14 will decrease. During the movements along the two non-self-locking threads 21 and 30 a gear or transmission ratio will be produced between the movement of the piston 2 and the movement of the sleeve 32 which corresponds to the ratio between the pitches of the two non-self-locking threads 21 and 30. As a result, the axial displacement of the sleeve 32 will be greater than the axial displacement of the piston 2. It is this increased movement of the sleeve 32 and consequently the connection eye 33 which rapidly overcomes the slack in the brake rigging.

When the actual slack in the brake rigging corresponds to the desired slack, the above described movements of the components of the brake unit will continue until the radial surface of the flange 14 engages the control nut 22 so that the stop constituted by these surfaces is now brought into being. The slack in the brake rigging is now exhausted and the brake surfaces are in contact with each other so as to almost abruptly apply a substantially increased resistance against any further axial movement of the connection eye 33 in the brake applying direction. Accordingly, as the piston 2 continues to be axially displaced in the brake applying direction, the springs 18 and 35a can no longer move the assembly 32, 33, 34 any further in the brake applying direction. At that moment the assembly will remain stationary and the spindle shaft 28, the control nut 22 and the control shaft 13 will also remain stationary. However, the continued axial movement of the piston 2 in the brake applying direction will now compress the spring 18 and the coupling 15 will be disengaged and after additional displacement of the piston the coupling 27 will become engaged and the spindle shaft 28 will now be locked against rotation.

As the piston 2 continues to be displaced in the brake applying direction, there will now be a direct corresponding displacement in the brake applying direction of the control nut 22, the spindle shaft 28 and the assembly 32, 33, 34. The brake force being transmitted by the brake unit will now increase rapidly during any elastic deformation of the brake rigging. During this last mentioned stage of axial displacement there is no increased displacement of the push sleeve 32 with respect to the displacement of the piston 2. The spring 35a will be expanded and the spring 35b will become compressed as the ball bearing ring 24 leaves its contact with the shoulder 9 on the flange 10.

During the subsequent release of the brake, the pressure acting upon the piston 2 is decreased and the return spring 4 as well as any resilient forces built up in the brake rigging will cause the piston 2 to move in the brake release direction which is toward the right as viewed in FIG. 1. This initial movement of the piston 2 will occur while the control nut 22, spindle shaft 28, push sleeve 32 and the connection eye 33 are all connected to the piston 2 by means of the coupling 27 between coupling surfaces A and D. The moment that the force between the brake surfaces has ceased and the brake surfaces have become disengaged, the ball bearing ring 24 will have reached its position against the shoulder 9 on the flange 10. Further travel of the piston 2 in the brake release direction will now occur only by the force exerted by the return spring 4 and the control nut 22 will be prevented from further axial movement. The control shaft 13 will now remain stationary and the coupling 27 will disengage. After additional travel of the piston 2, the coupling 15 will be engaged and during still further travel of the piston 2 the control shaft 13 will also participate in this movement and cause the control nut 22 to rotate because of the non-self-locking threads 21 between the control shaft 13 and control nut 22. The rotation of the control nut 22 will also cause the spindle shaft 28 to rotate and because of the non-self-locking threads 30, the adjuster nut 31 will move on the spindle shaft 28 axially in the brake release direction to thereby produce a slack between the brake surfaces.

The total force exerted by the return spring 4 and the spring 35b should be greater than the force exerted by the spring 35a. As a result, the stop surfaces 26 on the control nut 22 and the flange 14 will become separated and this separation will increase until the distance X has been restored.

In the event there is an excess of slack between the brake surfaces, a slack greater than the distance X, such as may be produced by wear of the brake surfaces or other reasons, the application of the brake will proceed in the same manner as described above until the distance X between the stop surfaces 26 has been overcome. However, when the distance X no longer exists, the brake surfaces still have not contacted each other and the resistance exerted against the displacement of the connection eye 33 in the brake applying direction is still minimal. Upon further displacement of the piston 2 in the brake applying direction, the coupling 15 will be disengaged and the control shaft 13 will no longer be locked against rotation. Since the coupling 27 has not yet been engaged, the force exerted by the spring 35a will cause the connection eye 33 and the other components of the assembly 32, 33, 34 to move in the brake applying direction until the brake surfaces engage each other so as to provide an increased resistance against such movement. During this movement of the assembly 32, 33, 34, the spindle shaft 33 and the control nut 22 will not move axially but will rotate on the non-self-locking threads 30. The control shaft 13 cannot be threaded into the control nut 22 because of the contact between the stop surfaces 26 and thus the control shaft 13 will follow the rotation of the control nut 22 which rotation is permitted by the uni-directional clutch 20. The excessive slack between the brake surfaces has now been adjusted to the desired value. Upon further displacement of the piston 2 in the brake applying direction the coupling 27 will be engaged and subsequent application of the brakes will occur as described above with a rigid connection being established between the piston 2 and the connection eye 33.

The subsequent brake release operation will be performed in the same manner as previously described above.

In the event that there is insufficient slack in the brake rigging, the brake surfaces will be in contact before the piston 2 has been axially displaced corresponding to the distance X. At this stage, the stop surfaces 26 of the flange 14 and control nut 22 have not yet come into contact with each other. Upon further displacement of the piston 2, the assembly 32, 33, 34 as well as the spindle shaft 28, the control nut 22 and the control shaft 13 will cease to move in the brake applying direction. Upon further displacement of the piston 2 the coupling 15 will be disengaged. The control shaft 13, however, cannot be threaded into the control nut 22 by means of force exerted by the spring 18 because the uni-directional clutch 20 prevents any rotation in this direction. During further travel of the piston 2, the assembly 32, 33, 34, the spindle shaft 28 and the control shaft 13 as well as the spring support 17 will remain stationary while the spring 18 is compressed. After additional travel of the piston 2 the coupling 27 will become engaged to again rigidly connect the piston to the assembly 32, 33, 34 and continued application of the brake operation will be performed as described above. The ball bearing ring 24 will become separated from the shoulder 9 on the flange 10 to establish a gap or separation corresponding to the resilient deformation in the brake rigging.

During the subsequent brake release operation, all components which were displaced in the brake applying direction in FIG. 1 will return in the brake release direction until the ball bearing ring 24 again contacts shoulder 9 on the flange 10. At this moment of contact, the brake surfaces are in contact with each other but without transmitting any force. Upon further return movement of the piston 2, the coupling 27 will be disengaged. After additional return displacement of the piston 2 corresponding to the difference between the desired slack and the existing insufficient slack in the brake rigging, the coupling 15 will become engaged. During that interval when the two couplings 27 and 15 were disengaged, the uni-directional clutch 20 will prevent the control shaft 13 from being threaded into the control nut 22 which is maintained stationary by the spring 35b. The spring 18 will be expanding while at the same time trying to influence the control shaft 13 to perform this movement. During the remaining portion of the return stroke of the piston 2, the control shaft 13 will follow the piston 2 without rotation because of the engaged coupling 15. As a result, the control nut 22 will rotate because of its connection through the threads 21 and the adjuster nut 31 will move in the brake release direction as previously described because of the rotation of the spindle shaft 28 caused by the rotation of the control nut 22. The adjuster nut 31 will cause a corresponding movement of the assembly 32, 33, 34 while the spring 35a is compressed and the brake surfaces will be displaced away from each other. No adjustment has thus been performed.

The device as illustrated and described in FIG. 1 can also be used to automatically adjust slack during the return stroke of a braking operation and not during the brake application stroke as described above. Should this be desired, the spring 35 a is dimensioned to exert a weaker force so that it will be unable to push the assembly 32, 33, 34 forward in the brake applying direction. The spring 35a should be so weak that it cannot overcome the friction resistance in the brake rigging including the force of any external return springs. During a braking application where there is excessive slack, the device will operate as previously described until the stop surfaces engage each other. During further displacement of the piston 2, the spring 35a will not be able to push the assembly 32, 33, 34 after the clutch 15 has been disengaged. The assembly 32, 33, 34 will thus remain stationary together with the spindle shaft 28, the control nut 22 and the control shaft 13 and the coupling 27 will become engaged after a short additional displacement in the brake applying direction of the piston 2 to establish a rigid connection between the piston 2 and the assembly 32, 33, 34. Further displacement of the piston 2 in the brake applying direction will now be directly transmitted to the assembly 32, 33, 34 during the remaining portion of the brake stroke necessary to overcome slack and during the subsequent building up of the brake force in the brake rigging. The gap between the shoulder 9 and the flange 10 and the bearing ring 24 will now correspond to the sum of the excessive portion of the slack in the brake rigging and the resiliency in the rigging during the final increase and application of brake force.

During the subsequent release of the brake, the piston 2 together with the other components which have been displaced in the brake applying direction will move in the brake release direction until the brake force at the brake surfaces has ceased. Upon further return movement of the piston 2 the assembly 32, 33, 34 will remain stationary together with the spindle shaft 28 and the control nut 22 until the coupling 27 becomes disengaged. The spring 35b will now push the bearing ring 24 toward the shoulder 9 on the flange 10 during continued return movement of the piston 22 and at the same time the spindle shaft 28 will be threaded out of the stationary adjuster nut 31 and moved in the brake release direction. The stop surfaces 26 are still in contact and therefore the control nut 22 which is rotating together with the spindle shaft 28 will cause the control shaft 13 to also rotate. The uni-directional clutch 20 will permit the control shaft 13 to rotate in this direction. As soon as the gap between the bearing ring 24 and the shoulder 9 on the flange 10 has been overcome, the excessive portion of the slack in the brake rigging has now been compensated for. During the remaining portion of the return stroke of the piston 2, the coupling 15 will be engaged to lock the control piston 13 against rotation so that the control shaft 13 will now follow the axial return movement of the piston 2. The control nut 22 which is axially restrained by the ball bearing 23 will be caused to rotate because of the non-self-locking threads 21 between the control shaft 13 and the control nut 22. This rotation will also cause rotation of the spindle shaft 28 so that because of the non-self-locking threads 30 the adjuster nut 31 will move upon the spindle shaft 28 axially in the brake release direction to thereby produce the desired slack between the brake surfaces.

It is to be noted that the slack adjusting device in the brake unit of FIG. 1 is single-acting in that it would only compensate for excessive slack but not for insufficient slack. If it should be desired to increase the slack in the brake rigging as may occur when installing new brake shoes, this may be done manually by disconnecting the eye 33 from the brake rigging and manually rotating the assembly 32, 33, 34 to thereby cause the adjuster nut 31 to move in the brake release direction upon the spindle shaft 28. In the event that the eye 33 is connected to the brake rigging by a structure which permits relative rotation it is then possible to provide a locking device, as previously mentioned but not shown, against relative rotation between tubular elements 25 and 34. Such a locking device can be constructed to be manually releasable and will thus permit a direct manual rotation of the adjuster nut 31. Also, it would be possible to provide a suitable device, which is not shown, by means of which the function of the uni-directional clutch 20 could be manually or automatically eliminated in the brake release position. If such a device is provided, it is then possible to increase the slack simply by pushing the connection eye 33 in the brake release direction. This would then cause the spindle shaft 28 to rotate because of the non-self-locking threads 30. The control nut 22 will also participate in this rotation and thus cause the control shaft 13 to move in the brake release direction against the force of the spring 18 until the coupling 15 becomes disengaged. Since the uni-directional clutch 20 is inactive, the control shaft 13 will now follow the rotation of the control nut 22. As soon as the movement of the connection eye 33 has been stopped, the coupling 15 will be reengaged because of the force exerted by the spring 18.

Figure 2:
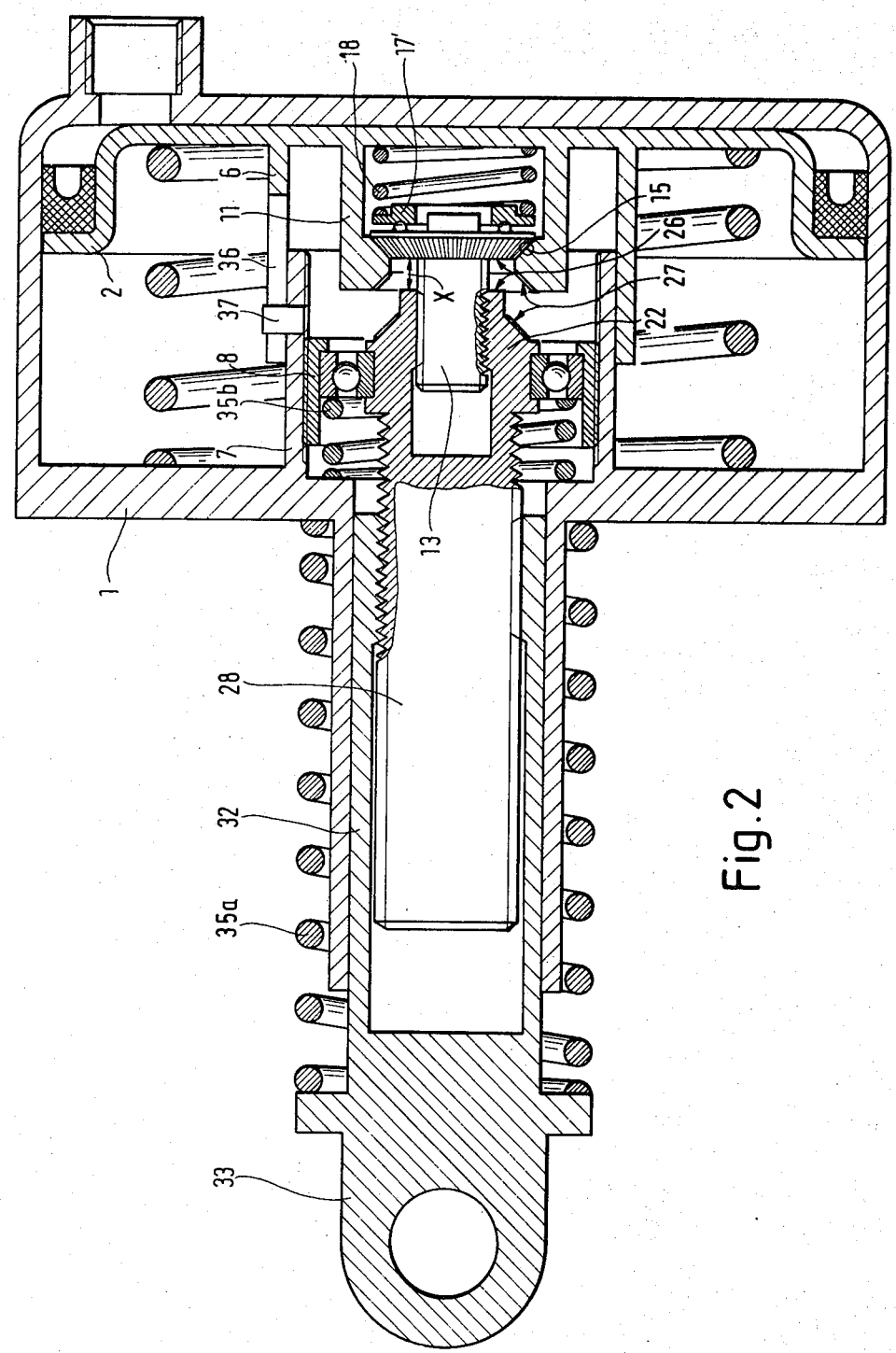
FIG. 2 is a view similar to that of FIG. 1 and showing a modification thereof.

The slack adjuster device of the brake unit may be made double-acting so that the device is also able to automatically restore an insufficient slack to the desired value. It is only necessary to remove the spring 19 of the uni-directional clutch 20. Such a device is shown in FIG. 2 which differs from FIG. 1 mainly in that the uni-directional clutch 20 has been omitted. In addition, the spring support 17' has been simplified in construction. Further, the sleeve 6 which is rigidly connected to the piston 2 has been provided with an axially extending slot 36 in which is slidably received a radially extending pin 37 which is rigidly connected to the sleeve 7 which is a part of the cylinder housing 1. This construction has the function of locking the piston 2 against rotation. It is to be borne in mind that all of the brake units according to the present invention the piston 2 must be locked against rotation. Also in FIG. 2 the guide sleeve 34 has been omitted and the spring 35a is located externally.

When there is normal or excessive slack in the brake rigging, the brake unit of FIG. 2 will function in the same manner as the unit of FIG. 1 and it is therefore considered unnecessary to describe this in further detail.

However, when there is insufficient slack in the brake rigging a brake application operation will be performed as follows:

The piston 2 will be moved in the brake applying direction under force exerted by a pressurized medium introduced through the inlet 3. The coupling 15 will remain engaged and the control shaft 13 will also participate in the axial movement. The control nut 22 and the spindle shaft 28 will not move axially because of the spring 35b but these components will rotate and thus cause an axial displacement of the assembly 32, 33 until the brake surfaces become engaged. However, because of the insufficient slack in the brake rigging, the contact between the brake surfaces will occur prior to the engagement of the stop surfaces 26. Upon further displacement of the piston 2 in the brake applying direction, the assembly 32, 33 will remain stationary because of the significant increase in resistance offered by the brake rigging against further movement in the brake applying direction. The spindle shaft 28 and the control shaft 13 will also remain stationary until the coupling 15 is disengaged. When the coupling 15 is disengaged, the spring 18 will then cause the control shaft 13 to rotate and to be axially displaced into the control nut 22 following the movement of the piston 2 until the gap X between the stop surfaces 26 has been overcome. During further displacement of the piston 2, the coupling 27 will be engaged and the piston 2 will now be rigidly connected to the assembly 32, 33 as previously described in connection with the brake unit of FIG. 1. Additional displacement of the piston 2 will now overcome any resilient deformation in the brake rigging and bring about an increase in brake force. It is to be understood that the axial displacement of the control shaft 13 into the control nut 22 after application of the brake will restore the slack in the brake rigging to the desired value during the subsequent brake release operation.

An increase of slack in the brake rigging may be performed manually with a device according to FIG. 2 simply by pushing the connection eye 33 in the brake release direction as described above in FIG. 1 since the uni-directional clutch 20 has been eliminated in the unit of FIG. 2.

Figure 3:
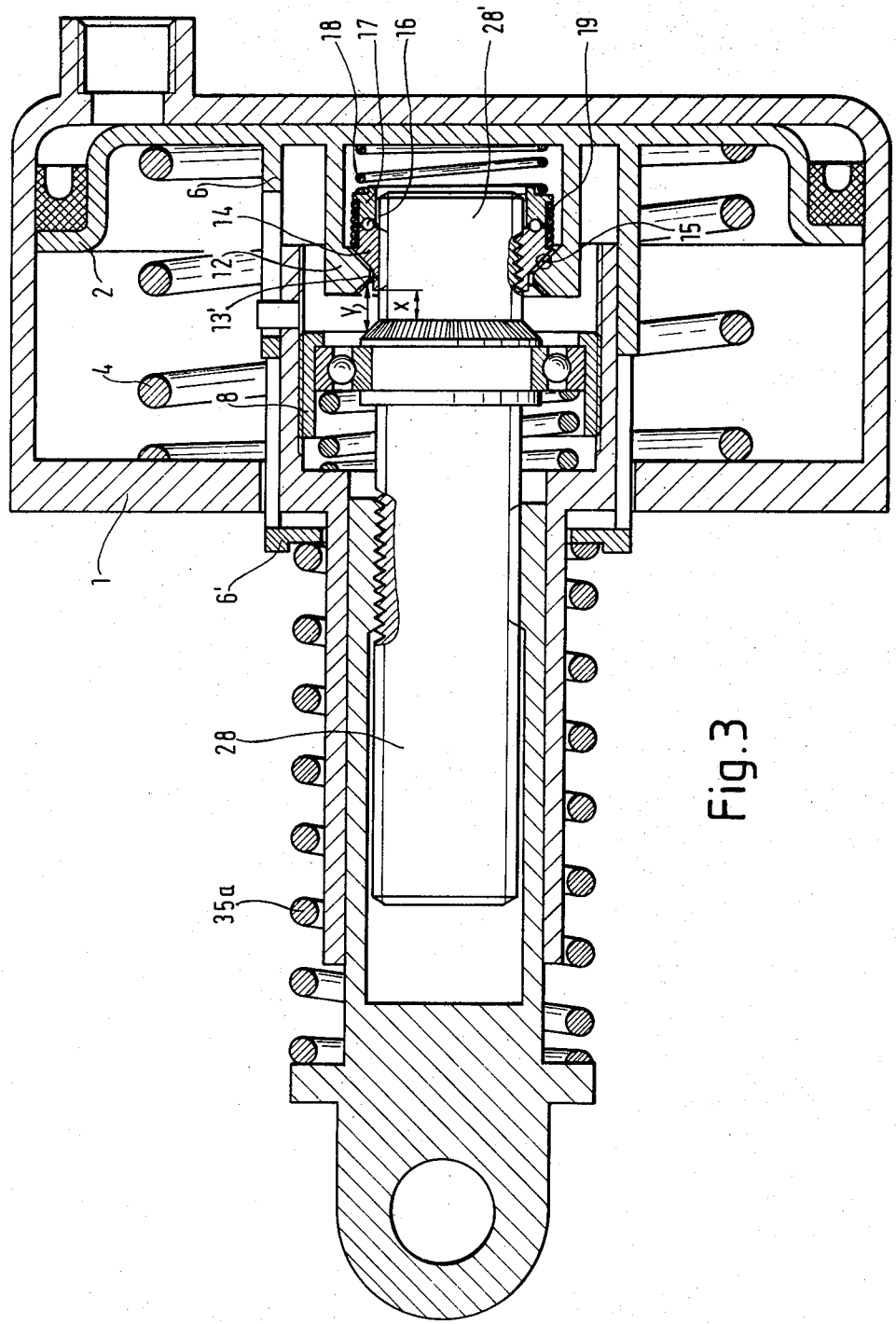
FIG. 3 is a view similar to that of FIG. 1 and showing still a further modification.

The brake unit in FIG. 3 functions in the same manner as the brake unit of FIG. 1 but is modified in that the spindle shaft 28 is provided with an axial extension 28' in the brake release direction. This extension 28' is provided with non-self-locking threads of the same or smaller pitch as the pitch of the threads on the spindle shaft 28. The extension 28' also carries a nut 13' upon which is a flange 14 which together with the flange 12 provides a coupling 15. The flange 12 is rigidly connected to the piston 2. In addition, the spring 35a of FIG. 3 is supported upon a flange 6' attached to the sleeve 6 which in turn is rigidly connected to the piston 2.

The nut 13' has a function similar to the function of the control shaft 13 in FIG. 1. The support of the spring 35a against the piston 2 reduces the force of the return spring 4. As the entire spring 35a follows the piston 2 at the beginning and at the end of each braking cycle, the return spring 4 does not require the force necessary for reloading the spring 35a at the end of the brake release operation. Thus, the resistance offered by the return spring 4 against movements of the piston 2 will be decreased.

Figure 4:
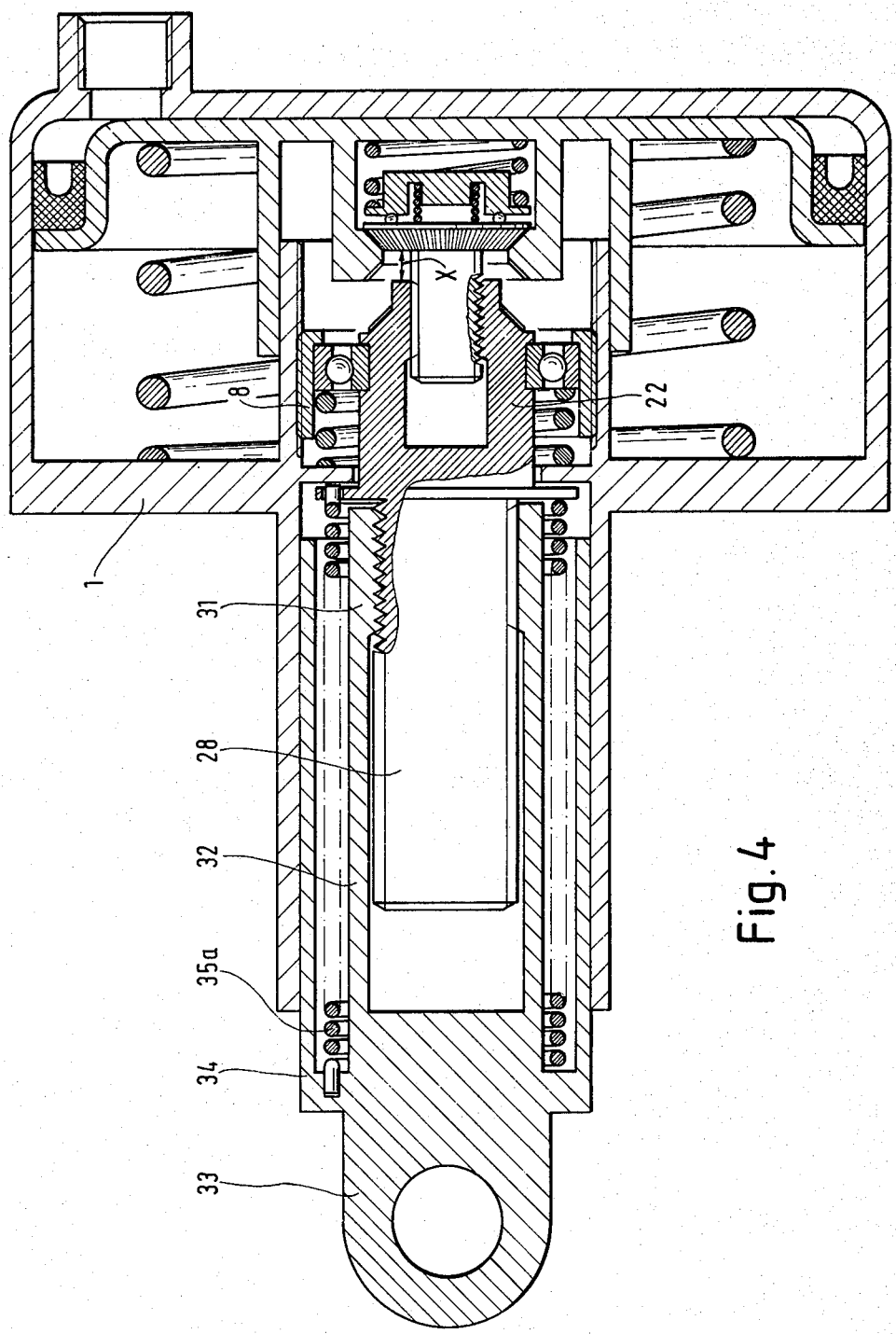
FIG. 4 is a view similar to that of FIG. 1. and showing still another modification in which the slack adjusting function is achieved through torsion spring force.

The brake unit of FIG. 4 differs from the brake unit of FIG. 1 in that the spring 35a is constructed as a coiled torsion spring having no axial force but only a torque. This torque is transmitted directly between the assembly 32', 33', 34 and the spindle shaft 28. As the torque to the spindle shaft 28 and the control nut 22 is applied directly by the spring 35a less energy is consumed in the thread connection between the spindle shaft 28 and the adjuster nut 31.

Rotation of the spring support 17 with respect to the piston 2 can also be prevented using a construction similar to the elements 36 and 37 as shown in FIG. 2. While not illustrated, a portion of the spring support 17 may protrude into an axially extending slot formed in the sleeve 11.

In all of the brake units of FIGS. 1–4, the sleeve 8 is threaded within the tubular element 7 so that the sleeve 8 can be axially displaced with respect to the cylinder housing 1 in order to set the desired slack.

It is to be pointed out that all of the brake units described above and disclosed in FIGS. 1–4 will adjust any slack in the brake rigging during the brake release operation if the brake unit is employed with a brake rigging which exerts a resistance against movement for application of the brake which exceeds the force of the spring 35a. The result will be a reliable functioning.

Thus it can be seen that the present invention has disclosed a brake unit for a railway brake having a slack adjuster which provides for an internal leverage which increases the speed of the brake application with respect to the speed of the piston. As a result, the brake unit sleeve which is connected to the brake rigging will move at a faster speed during the initial portion of the brake stroke in order to overcome any slack in the brake rigging but, upon contact of the brake surfaces, the sleeve will be rigidly connected to the piston and be displaced at the same speed as the piston so as to apply the braking force. This brake unit thus provides for different internal gear or transmission ratios before and after the brake surfaces have come into contact with each other.

It will be understood that this invention is susceptible to modification in order to adapt it to different usages and conditions and, accordingly, it is desired to comprehend such modifications within this invention as may fall within the scope of the appended claims.

What is claimed is:

1. A brake unit for automatically adjusting slack between brake surfaces of a brake particularly for rail vehicles comprising a cylinder having a tubular extension, a sleeve adapted to be connected to brake rigging axially displacable within said cylinder tube extension and having a threaded adjusting nut rigidly attached thereto, a spindle shaft having first non-self-locking threads engaging said adjusting nut such that said spindle shaft is axially displacable with respect to said sleeve, said spindle shaft having second non-self-locking threads thereon, a first spring acting against said sleeve in a direction to increase the total length of said sleeve and spindle shaft, a piston slidable within said cylinder and having opposed first and second coupling surfaces to transmit torque and axial forces, said first and second coupling surfaces transmitting axial forces in opposite directions, a first shoulder on said cylinder to limit axial movement of said spindle shaft in a brake release direction, a second spring acting against said spindle shaft in the brake release direction to urge said spindle shaft against said first shoulder, a control shaft threadedly engaged with said second non-self-locking threads of said spindle shaft and axially and rotatably moveable with respect thereto, said control shaft having a third coupling surface thereon, a third spring acting between said piston and said control shaft in the same direction as said first spring to urge said third coupling surface into engagement with said second coupling surface, there being a fourth coupling surface on said spindle shaft engageable with said first coupling surface, said spindle shaft and said control shaft having axially spaced opposing surfaces and the axial distace between said opposing surfaces being less than the axial distance between said fourth and first coupling surfaces when the brake unit is in a brake release position, said first coupling surface engaging said fourth coupling surface when said opposing surfaces contact each other and said second and third coupling surfaces are disengaged.

2. A brake unit as claimed in claim 1 wherein said first spring is pre-stressed to a force exceeding a force transmitted by the brake rigging when moving to overcome play therein.

3. A brake unit as claimed in claim 1 and further comprising uni-directional clutch between said control shaft and said piston to enable said control shaft to rotate with respect to said spindle shaft in a direction to cause axial displacement of said control shaft in the brake release direction with respect to said spindle shaft.

4. A brake unit as claimed in claim 1 wherein the pitch of said second non-self-locking thread is smaller than the pitch of said first non-self-locking thread.

5. A brake unit as claimed in claim 1 wherein said first spring is disposed between a second shoulder on said sleeve and a third shoulder on said piston.

6. A brake unit as claimed in claim 1 wherein said first spring is a torsion spring and is connected between said sleeve and said spindle shaft.

7. A brake unit as claimed in claim 1 and further comprising means on said cylinder for selectively varying the axial position of said first shoulder with respect to the axial position of said cylinder.

* * * * *